(12) United States Patent
Hatfield et al.

(10) Patent No.: US 7,825,046 B2
(45) Date of Patent: Nov. 2, 2010

(54) OLEOPHOBIC LAMINATED ARTICLE

(75) Inventors: Martin G. Hatfield, Odessa, MO (US);
Gopakumar Thottupurathu, Overland Park, KS (US); Nusrat Farzana, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/040,199

(22) Filed: Feb. 29, 2008

(65) Prior Publication Data

US 2009/0220763 A1    Sep. 3, 2009

(51) Int. Cl.
*B32B 5/02* (2006.01)

(52) U.S. Cl. .......................... 442/80; 428/315.5; 442/82

(58) Field of Classification Search .................. 442/80, 442/82
See application file for complete search history.

(56) References Cited

U.S. PATENT DOCUMENTS

| 6,344,243 | B1 | 2/2002 | McClain et al. |
| 6,582,113 | B2 * | 6/2003 | Rogers ...................... 362/547 |
| 2004/0059717 | A1 | 3/2004 | Klare et al. |

OTHER PUBLICATIONS

Gore AVS Product Specification.

* cited by examiner

*Primary Examiner*—Lynda Salvatore
(74) *Attorney, Agent, or Firm*—Greg Strugalski; Ernest G. Cusick; Frank A. Landgraff

(57) ABSTRACT

An article includes a microporous membrane. A porous fabric is laminated to the microporous membrane to form a laminate with a membrane side and a fabric side. A treatment material is applied to the laminate to form a treated laminate. The treated laminate having an oil resistance of at least a number 7 determined by AATCC 118 testing on both the membrane side and the fabric side. The treated laminate also has an air permeability through the treated laminate of at least 0.01 CFM per square foot determined by ASTM D737 testing.

18 Claims, 3 Drawing Sheets

OLEOPHOBIC LAMINATED ARTICLE

BACKGROUND

The invention is generally directed to a laminated article. In particular, the invention is directed to laminated sheet material having improved oleophobic properties and components made from the laminated sheet material.

Components made from laminated sheet material have many uses and can be made to have various properties. The properties often result from the manufacture of the laminated sheet material and the materials used to make them. The properties can also be modified by chemical treatments. In some applications, components made from the laminated sheet material are useful as vents or filters that allow the flow of gas, such as air through the component, while preventing or restricting the flow of certain liquids, such as water, or oil.

The laminated sheet material typically includes one or more porous layers of sheet material that are laminated together. The layers of sheet material may be treated with, or formed using, a material that prevents or resists the flow of selected matter through the layer. For example, a layer of the sheet material may be treated with, or formed using, a hydrophobic material to resist the passage of water through the component made from the laminated sheet material. It may also be desired that one or more layers of the sheet material has oleophobic properties.

As the components made from laminated sheet material are used in more diverse applications and in harsher environments, improvements to the laminated sheet material and the components are desired.

BRIEF DESCRIPTION

One aspect of the invention is an article including a microporous membrane. A porous fabric is laminated to the microporous membrane to form a laminate with a membrane side and a fabric side. A treatment material is applied to the laminate to form a treated laminate. The treated laminate has an oil resistance of at least a number 7 determined by AATCC 118 testing on both the membrane side and the fabric side. The treated laminate also has an air permeability through the treated laminate of at least 0.01 CFM per square foot determined by ASTM D737 testing.

Another aspect of the invention is a vent that includes a microporous membrane of expanded polytertafluoroethylene (ePTFE). A porous fabric is laminated to the microporous membrane to form a laminate with a membrane side and a fabric side. A treatment material is applied to the laminate to form a treated laminate. The treated laminate has an oil resistance of at least a number 7 determined by AATCC 118 testing on both the membrane side and the fabric side. The treated laminate also has an air permeability therethrough of at least 0.01 CFM per square foot determined by ASTM D737 testing.

Yet another aspect of the invention is an article comprising a microporous membrane of expanded polytetrafluoroethylene (ePTFE). A porous fabric is laminated to the microporous membrane to form a laminate with a membrane side and a fabric side. A treatment material is applied to the laminate to form a treated laminate. The treated laminate has an oil resistance of at least a number 8 determined by AATCC 118 testing on both the membrane side and the fabric side. The treated laminate has an air permeability through the treated laminate of at least 0.15 CFM per square foot determined by ASTM D737 testing. The treated laminate also has an a Mullen Water Entry pressure determined by challenging the membrane side of at least 10 PSI.

DRAWINGS

These and other features, aspects, and advantages of the invention will be better understood when the following detailed description is read with reference to the accompanying drawings, in which.

DETAILED DESCRIPTION

Various aspects of the invention relate to a laminated article and components made from the laminated article. The laminated article is illustrated, by way of example, as laminated sheet material. The components made from the laminated sheet material are illustrated, by way of example, as vents.

Figure 1:
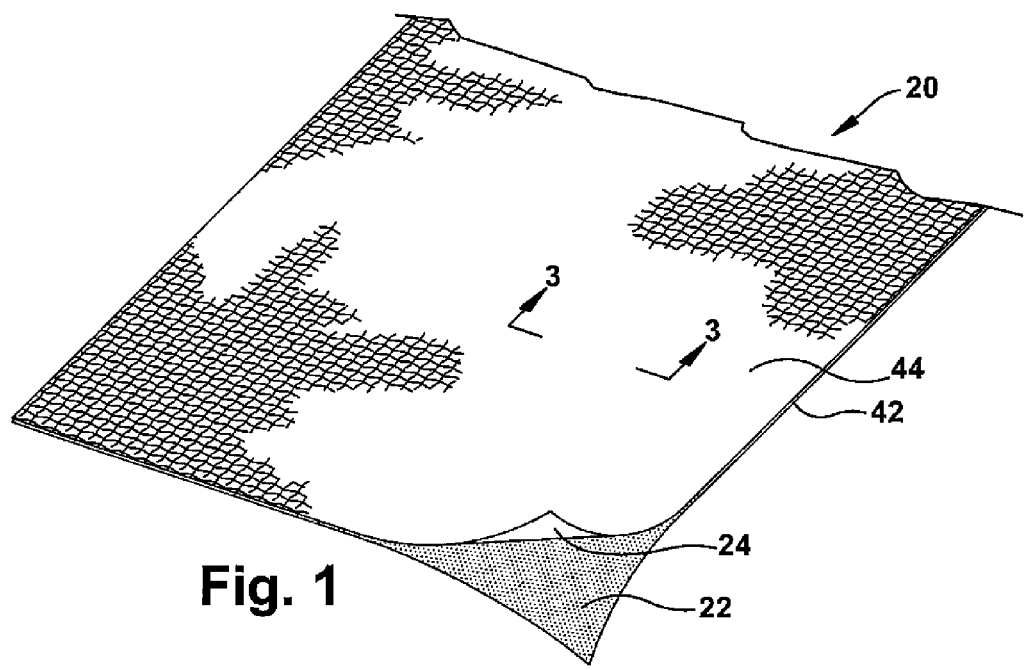
FIG. 1 is a perspective representation of laminated sheet material according to one aspect of the invention.
Figure 3:
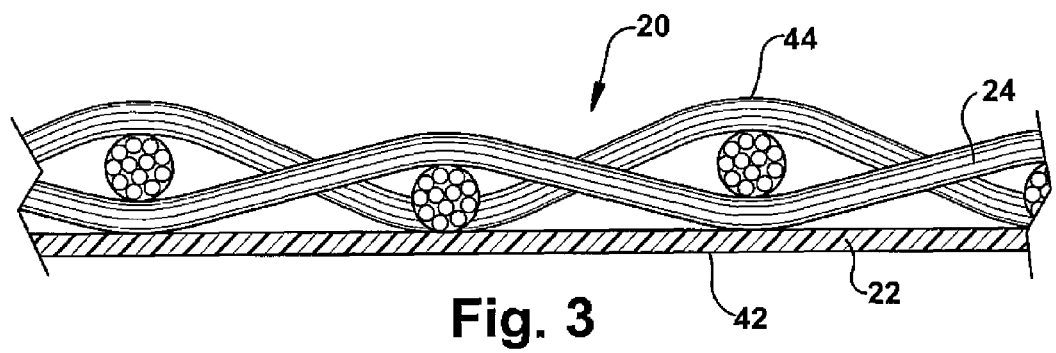
FIG. 3 is an enlarged cross-sectional view of a portion of the laminated sheet material illustrated in FIG. 1, taken approximately along the line 3-3 in FIG. 1.

FIGS. 1 and 3 illustrate a laminated article 20 as sheet material according to one aspect of the invention. The laminated article 20 includes a membrane 22 adhered to a support fabric 24. The resulting laminated article 20 has a membrane side 42 and a fabric side 44.

The laminated article 20 is hydrophobic on both the membrane side 42 and the fabric side 44. That is, the laminated article 20 prevents or resists the passage of liquids, such as water, through the laminated article. The laminated article 20 is gas permeable and moisture vapor transmissive. That is, the laminated article 20 permits the passage of gases, such as air, carbon dioxide and water vapor, through it. An oleophobic treatment is applied to the entire laminated article 20 from an inorganic solvent according to one aspect of the invention to provide improved oleophobicity. The addition of the oleophobic treatment increases the resistance of the laminated article 20 to being fouled by oil or oily substances from either the membrane side 42 or the fabric side 44.

The membrane 22 is preferably a microporous polymeric membrane that allows the flow of gases, such as air or water vapor, into or through the membrane 22 and is hydrophobic. A preferred microporous polymeric membrane for use as the membrane 22 includes expanded polytetrafluoroethylene (ePTFE) that has preferably been at least partially sintered. An ePTFE membrane typically comprises a plurality of nodes interconnected by fibrils to form a microporous lattice type of structure, as is known.

Surfaces of the nodes and fibrils define numerous interconnecting pores that extend completely through the membrane 22 between the opposite major side surfaces 42, 44 of the membrane in a tortuous path. Preferably, the average size of the pores in the membrane 22 is sufficient to be deemed microporous, but any pore size may be used. A suitable average size for the pores in the membrane 22 may be in the range of 0.001 micron to 10 microns, and preferably in the range of 0.005 to 5.0 microns. Typically, the porosity (i.e., the percentage of open space in the volume of the membrane 22) of the membrane 22 is between about 50% and about 98%. Often the porosity of the membrane 22 of a laminated article 20 suitable for many filtering applications ranges from about 70% to about 95%, and preferably from about 80% to about 95%. The material and average pore size of the membrane 22 establish the hydrophobicity of the membrane.

The membrane 22 is preferably made by extruding a mixture of polytetrafluoroethylene (PTFE) fine powder particles (available from DuPont under the name TEFLON® fine powder resin) and lubricant. The extrudate is then calendered. The calendered extrudate is then "expanded" or stretched in at least one direction and preferably two orthogonal directions, to form the fibrils connecting the nodes in a three-dimensional matrix or lattice type of structure. "Expanded" is intended to mean sufficiently stretched beyond the elastic limit of the material to introduce permanent set or elongation to the fibrils. The membrane 22 is preferably then heated or "sintered" to reduce and minimize residual stress in the membrane material. However, the membrane 22 may be unsintered or partially sintered as is appropriate for the contemplated use of the membrane. An example of suitable membrane 22 properties includes a unit weight of about 0.42 ounce per square yard, an air permeability of about 1.5 CFM, a Mullen Water Entry pressure of about 15 PSI and a moisture vapor transmission rate (MVTR) of about 60,000 grams per square meter per day ($gr/m^2/day$).

It is known that porous ePTFE membrane 22, while having excellent hydrophobic properties, is oleophilic. That is, the material making up the membrane 22 is susceptible to contamination by absorbing oil. Once this occurs the contaminated regions of the membrane 22 are considered "fouled" because the pores can be easily wet by a challenge liquid, such as water, and the membrane is no longer considered hydrophobic.

Other materials and methods can be used to form a suitable membrane 22 that has an open pore structure. For example, other suitable materials that may be used to form a porous membrane include, but are not limited to, polyolefin, polyamide, polyester, polysulfone, polyether, acrylic and methacrylic polymers, polystyrene, polyurethane, polypropylene, polyethylene, cellulosic polymer and combinations thereof. Other suitable methods of making a microporous membrane 22 include foaming, skiving, casting or laying up fibers or nano-fibers of any of the suitable materials.

Some membranes 22, including, for example, many expanded PTFE membranes suitable for filtering or venting applications, are relatively thin and fragile. A support fabric 24 is included in the laminated article 20 to provide support to the membrane 22. The support fabric 24 may have other or alternative functions including, for example, restricting or preventing the flow of the same and/or different particles and fluids as the membrane 22 and/or protecting the membrane 22 or other layers in the laminated article 20 from damage.

The support fabric 24 is typically made from a porous woven, non-woven or scrim of polymeric material. Often the support fabric 24 is made using a fibrous material, however, other porous materials may also be used. The average pore size of the support fabric 24 is usually larger than the average pore size of the membrane 22, although this is not necessary in some applications. Thus, in some applications, the support fabric 24 acts to at least partially filter the fluid flowing into or through the laminated article. Typically, the average pore size of the support fabric is about 500 μm (micron) or less and often at least about 0.5 μm. The porosity of the support fabric is often in the range of about 20% to almost 90%.

Suitable polymeric materials for the porous support fabric 24 include, for example, stretched or sintered plastics, such as polyesters, polypropylene, polyethylene, and polyamides (e.g., nylon). These materials are often available in various weights including, for example, 0.5 oz/yd$^2$ (about 17 gr/m$^2$), 1 oz/yd$^2$ (about 34 gr/m$^2$), and 2 oz/yd$^2$ (about 68 gr/m$^2$). Woven fabric such as 70 denier nylon woven taffeta pure finish may also be used. Another suitable fabric is a non-woven textile such as a 1.8 oz/yd$^2$ co-polyester flat-bonded bi-component non-woven media.

The support fabric 24 and the membrane 22 are laminated together. The lamination of the support fabric 24 and the membrane 22 can be accomplished by a variety of methods, such as thermal lamination or adhesive lamination. FIG. 1 illustrates one aspect of a laminated article 20 in which the support fabric 24 and membrane 22 are adhered by thermal lamination. An example of the laminated article 20 is a non-woven polyester support fabric 24 thermally laminated to ePTFE membrane 22. Another example of the laminated article 20 is a woven taffeta support fabric 24 adhesively laminated to membrane 22.

Improved oleophobic properties of the laminated article 20 are realized according to one aspect of the invention by treating surfaces defining the pores in the membrane 22 and support fabric 24 as well as the surfaces of the membrane side 42 and the fabric side 44 of the laminated article 20 with a fluorinated polymer treatment material, or fluorpolymer. The limiting factor previously has been the lack of an effective way to introduce the treatment material into the pores of the membrane 22 of the laminated article 20 and to evenly coat the surfaces defining its pores. The laminated article 20, according to one aspect of the invention, has the treatment material coating even the smallest pores of the membrane 22 of the laminated article. The applied treatment material modifies properties of the entire laminated article 20, such as oleophobicity.

It has been found that an inorganic fluid under supercritical conditions can dissolve the preferred fluorinated polymer treatment material. The resulting solution is capable of wetting the laminated article 20 and entering pores in the microporous membrane 22 with the dissolved fluorinated polymer treatment material. The solution with dissolved fluorinated polymer treatment material has a surface tension, viscosity and relative contact angle that permit the dissolved treatment material to be easily carried into the smallest pores of the membrane 22 and the support fabric 24 with the inorganic solvent.

The inorganic solvent is preferably carbon dioxide in a supercritical phase. The surface tension of the supercritical carbon dioxide ($SCCO_2$) solution is less than 1 dyne/cm and most preferably less than 0.1 dyne/cm so it can enter very small areas of the laminated article 20 to be treated, such as the pores of the membrane 22. Supercritical carbon dioxide also has a viscosity of less than about 0.1 centipoise. The viscosity and surface tension of the solution are extremely low so very little resistance to flow is encountered, thus, lending itself to the possibility of entering even the smallest pores of the membrane 22. Effective treatment is possible even if the laminated article 20 is in a confined state, such as in a tightly wound roll of sheet material.

The fluorinated polymer treatment material, or fluoropolymer, is deposited on and around surfaces of the nodes and fibrils that define the interconnecting pores extending through the membrane 22 and pores of the support fabric 24. This results in a relatively thin and even coating being applied to virtually all the surfaces of the laminated article 20. Once a predetermined proper amount of fluorinated polymer treatment material is deposited on the laminated article 20 the pores are not dramatically reduced in flow area from that of an untreated laminated article. Improved oleophobic properties are realized on both the membrane side 42 and the fabric side 44 of the laminated article 20.

Examples of suitable fluorinated polymer treatment materials include those having a fluoroalkyl portion or, preferably, a perfluoroalkyl portion. One such fluorinated polymer treatment material is a perfluorakyl acrylic copolymer referred to as Fabati 100 and was designed and synthesized by Micell Technologies, Inc. Fabati 100 was synthesized in MIBK (methyl isobutyl ketone) utilizing TAN (1,1,2,2,-tetrahydroperfluorooctyl acrylate); butyl acrylate; a cross-linking agent TMI (isopropenyl-a,a-dimethylbenzyl isocyanate); Vazo 52 initiator (2,4-dimethyl-2,2'-azobispentanenitrile). The Fabati 100 treatment material is cross-linked by a post-treatment cure with heat. Another suitable perfluorakyl acrylic copolymer is Fabati 200. Fabati 200 is similar to Fabati 100 but does not have the cross-linking agent (TMI) and HBA (4-hydroxybbutyl acrylate) is used instead of butyl acrylate. Thus, the Fabati 200 treatment material does not require post-treatment heating.

A variety of inorganic solvents can be used in the solution containing the oleophobic fluorinated polymer treatment material. The term "inorganic solvent" refers to non-aqueous solvents and combinations of non-aqueous solvents, and, in particular, to solvents comprising inorganic compounds. Suitable inorganic solvents include, for example, carbon dioxide (CO2), ammonia ($NH_3$), urea [$(NH_2)_2CO$], inorganic acids, such as hydrochloric acid, sulfuric acid, carbon tetrachloride and carbon tetrafluoride and oxides of carbon such as carbon dioxide ($CO_2$), carbon monoxide (CO), potassium carbonate and sodium bicarbonate. A choice of solvent or solvents may be affected by a variety of factors including solubility of the treatment material in the solvent, molecular weight of the solvent and polarity of the solvent. In preferred aspects of the invention, the treatment material is completely dissolved in the inorganic solvent. In other aspects of the invention, the treatment material is not fully dissolved in the inorganic solvent.

The amount of fluorinated polymer treatment material in the solution may vary over a wide range. Typically, the amount of fluorinated polymer treatment material in the solution affects the resultant oleophobicity of the laminated article 20. Typically, the amount of fluorinated polymer treatment material, or fluoropolymer, in the solution is about 25 wt % or less and preferably, about 10 wt % or less. For many applications, that the laminated article 20 is used in, the amount of fluoropolymer treatment material in the inorganic solvent ranges from about 0.8 wt % to about 10.0 wt % and preferably, from about 2.0 wt % to about 5.0 wt %.

The support fabric 24 and membrane 22 are treated together subsequent to lamination of the support fabric 24 and membrane 22. Typically, during treatment, the fluorinated polymer solution wets and, preferably, saturates, the support fabric 24 and membrane 22 of the laminated article 20. The use of an inorganic solvent facilitates the distribution of the fluorinated polymer treatment material throughout the support fabric 24 and membrane 22 of the laminated article. The inorganic solvent is then removed. The fluorinated polymer treatment material attaches to the support fabric 24 and membrane 22 and enhances the oleophobicity at both sides 42, 44 of the laminated article 20.

Optionally, the treated laminated article 20 may then be "cured" by heating. The "curing" process increases the oleophobicity by allowing rearrangement of the fluoropolymer into an oleophobic orientation. The curing temperature varies among fluoropolymers.

The laminated article 20 has a relatively high moisture vapor transmission rate (MVTR) and air permeability while its oleophobic properties are improved by the treatment material. Both sides 42, 44 of the laminated article 20 have an oil hold out rating of at least a number 7 rating as determined by AATCC 118 testing and preferably at least a number 8 rating. The laminated article 20 preferably has a moisture vapor transmission rate (MVTR) of at least 1500 gr/m$^2$/day and more preferably at least 15,000 g/m$^2$/day measured by JISL-1099B2 testing. The laminated article 20 preferably has an air-permeability of at least 0.01 CFM per square foot of membrane, preferably at least 0.05 CFM per square foot of membrane and more preferably at least 0.15 CFM per square foot of membrane measured by ASTM D737 testing. The laminated article 20 preferably has a Mullen Water Entry pressure of at least 10 PSI, preferably at least 15 PSI and more preferably 30 PSI.

The term "oleophobic" is used to describe a material property that is resistant to contamination from absorbing oils, greases, soap, detergent or body fluids, such as perspiration. An "oleophobic property" or "oleophobicity" of the laminated article 20 is typically rated on a scale of 1 to 8 according to AATCC test 118. This test objectively evaluates an article's resistance to wetting by various standardized challenge liquids having different surface tensions. Eight standard challenge liquids, labeled #1 to #8, are used in the test. The #1 challenge liquid is mineral oil (surface tension: 31.5 dynes/cm at 25° C.) and the #8 challenge liquid is heptane (surface tension: 14.8 dynes/cm at 25° C.). Five drops of each challenge liquid are placed on one side of the laminated article 20 to be tested. Failure occurs when wetting of the laminated article 20 by a selected challenge liquid occurs within 30 seconds.

The oleophobic rating number of a tested laminated article 20 corresponds to the last challenge liquid successfully tested. The higher the oleophobic number rating, the better the oleophobic property, or oleophobicity, as evidenced by resistance to penetration by challenge liquids of relatively lower surface tension. It was found that both the membrane side 42 and the fabric side 44 of the laminated article 20 were able to pass a challenge by hexane that has a relatively lower surface tension than heptane. Therefore, a new non-standard rating number of "8+" was adopted to indicate that a tested sample resisted penetration of hexane under standard test conditions. Thus, the term "preferably at least a number 8 rating" means that a standard number 8 rating or more is achieved by the tested sample. This is a significant improvement over known laminated articles.

The laminated article 20 was evaluated for water-proofness by a Mullen Water Entry Test (ASTM Standard D751-00 Method A). Mullen Water Entry Test is a test method that measures the ability of a fabric to resist leakage by pressure exerted by water. A hydrostatic force is applied to the laminated article 20 that is to be tested and is used to determine the pressure at which the laminated article begins to leak. The water entry pressure is measured in kilopascals or in PSI.

The laminated article 20 was mounted in a Mullen Water Entry test apparatus to challenge the membrane side 42. Water is forced against an unsupported area of a challenge side of the laminated article 20. The instant the laminated article 20 begins to leak, the inflation pressure drops. The pressure is recorded and is indicative of the resistance of the laminated article 20 to leakage. The membrane side 42 of the laminated article 20 has a Mullen Water Entry of at least 10 PSI, preferably at least 15 PSI and most preferably at least 30 PSI.

Sample laminates were treated according to one aspect of the invention. The properties that resulted from the treatment are reported in the following table. Sample laminate 1 has a woven nylon fabric available from Ramsey as part number 1BS196590. The fabric is adhesively laminated to QM0901 membrane available from BHA Group, Inc. Sample laminate 2 has a non-woven polyester fabric available from Freudenberg as part number PE939. The fabric is thermally laminated to QM0902 membrane available from BHA Group. Inc.

| Sample | Oil Hold Out Membrane Side | Oil Hold Out Fabric Side | Air Perm (CFM) | Mullen Water Entry (PSI) Membrane Side | Mullen Water Entry (PSI) Fabric Side | MVTR $g/m^2/day$ |
| --- | --- | --- | --- | --- | --- | --- |
| 1 | 8+ | 8+ | 0.48 | 50 | 14.5 | 18,000 |
| 2 | 8 | 8 | 0.1 | 64 | 52 | 35,000 |

Figure 2:
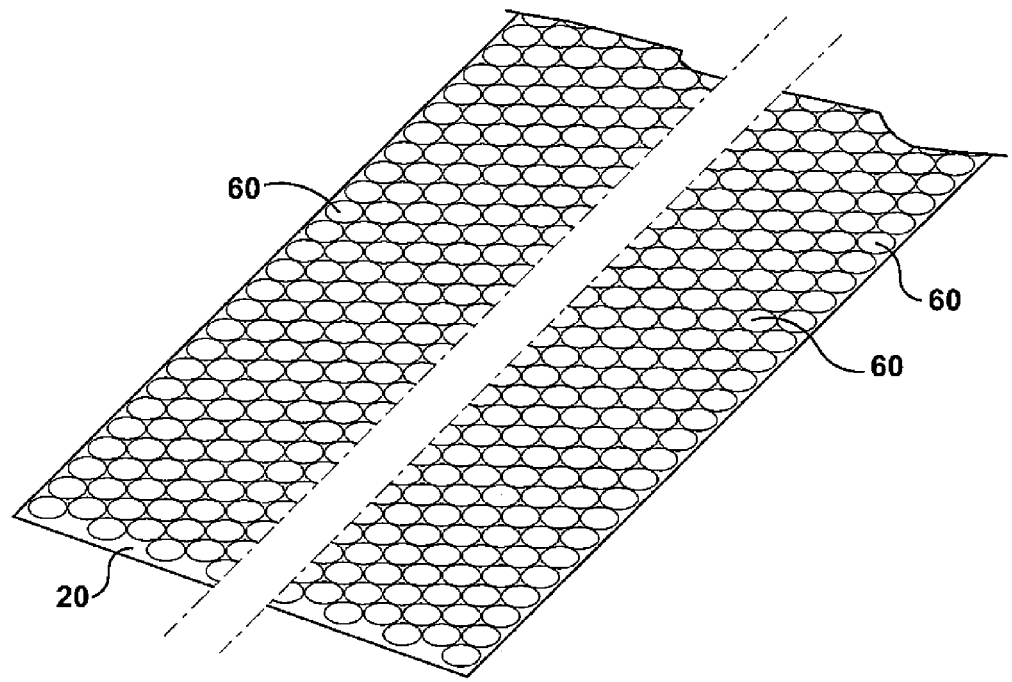
FIG. 2 is a perspective representation of a plurality of vents made from the laminated sheet material, illustrated in FIG. 1, according to another aspect of the invention.

Another aspect of the laminated article 20 of the invention is illustrated in FIG. 2. A plurality of vents 60 are die cut from the laminated article 20. Examples of applications in which the vents 60 made from the improved oleophobic laminated article 20 can be used include oil sensors, disk drives, gas sensors, optical sensors, pressure transducers, headlight breather filters, cellular phone filters, battery breathers, numerous automotive and medical vents, breathers or filters and motors. The use of the laminated articles 20 is not restricted to electronic devices. Other applications use vent filters to permit air flow through a port in the housing. Examples of these assemblies include sterile packaging, other packaging, medical devices, chain saw vents, ink-jet cartridges, chemical vents, anti-lock braking system (ABS) vents, and air bags.

One application of a vent filter made using the laminated article 20 of the invention is in the context of a headlamp for a vehicle, such as, for example, a car, bus, motorcycle, or truck. A headlamp includes a light source and a housing around the light source to protect the light source from damage and water. Pressure differentials caused, for example, by heating or cooling of the light source, can damage the light source if venting is not provided in the housing.

Figure 4:
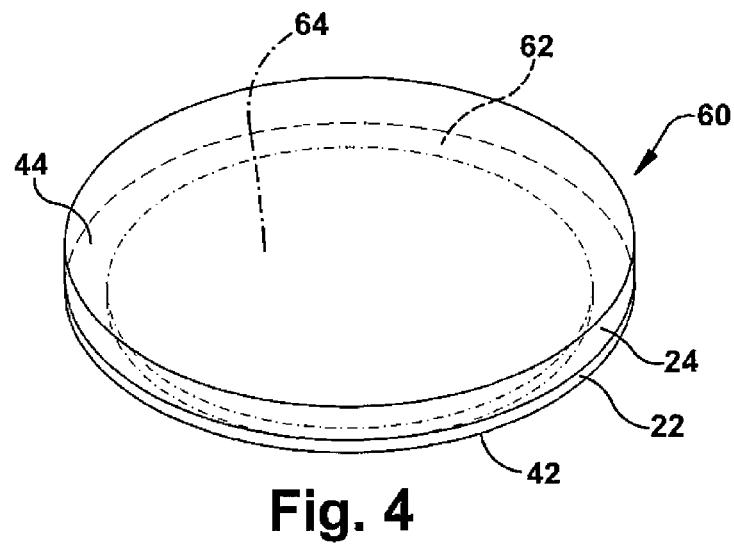
FIG. 4 is an enlarged perspective view of one of the vents illustrated in FIG. 2.

At least one aspect of the laminated article 20 of FIG. 4 is useful, for example, as a vent 60. In this embodiment, the laminated article 20 has a portion 62 of the membrane side 42 that is optionally covered with adhesive and another central portion 64 that is not covered. In operation, the vent 60 may be placed over an opening of a component, such as a housing or container, that requires venting. The adhesive portion 62 would engage the component to attach the vent 60 to the component. A gas, such as air, may then flow through the central portion 64 of the vent 60 with contaminants (e.g., particulate matter, water, and/or oily materials) being prevented or restricted from flowing through the central portion of the vent.

Figure 5:
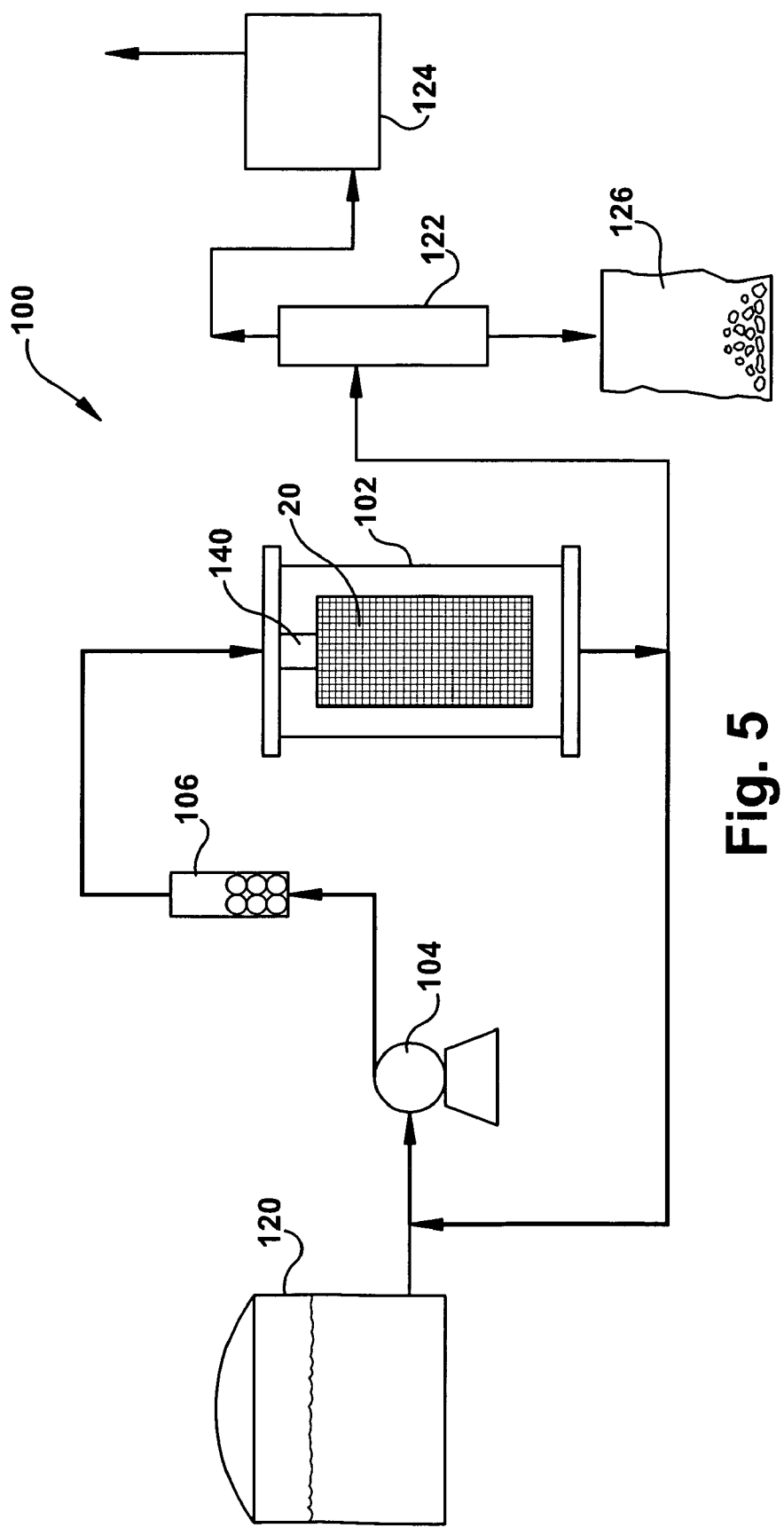
FIG. 5 is a schematic representation of the system and method used to treat the laminated sheet material, according to another aspect of the invention.

A system 100 for use in the method of treating the laminated article 20 according to one aspect of the invention is schematically illustrated in FIG. 5. The system 100 includes a vessel 102 for treating the laminated article 20. The vessel 102 is a pressure vessel capable of withstanding pressure up to 5,000 psi (about 345 bar) and elevated temperature in the range of 100° C. (212° F.). The vessel 102 is sized appropriately to treat the desired width and length of laminated article 20. The vessel 102 is fluidly connected to a supply and circulation pump 104. A treatment material introduction vessel 106 is located between the vessel 102 and pump 104.

Pump 104 is also connected to a solvent storage container 120. The storage container 120 houses liquid solvent under pressure and is maintained at a temperature to assure delivery of solvent in a liquid phase to pump 104. In one aspect of the invention, the solvent is carbon dioxide ($CO_2$). The vessel 102 is also connected to separation and recovery station 122. The separation and recovery station 122 is connected to a filtration system 124 that is vented to atmosphere. The separation and recovery station 122 is also connected to treatment recovery container 126 for recovering treatment material solids.

An untreated article, such as approximately 50 to 80 yards of 58-inch wide laminated sheet material is rolled onto a core 140 and secured at axially opposite ends to hold the roll of sheet material on the core and prevent fluid flow axially out the ends of the roll. The core 140 is made from any suitable material, such as perforated stainless steel. The core 140 and roll of sheet material are placed in the vessel 102. The core 140 and roll of sheet material are supported in the vessel 102 so the sheet material does not contact the interior wall of the vessel and fluid flow can occur around the entire roll. The sheet material is made from materials that do not dissolve in the selected solvent.

Particle solids of the preferred fluorinated polymer treatment material are placed in the treatment introduction vessel 106. Suitable treatment material has been found to be a perfluorakyl acrylic copolymer available under the tradename Fabati 100 or Fabati 200 from Micell Technologies, Inc. The amount of treatment material depends on the solution concentration desired in the system. For example, 5000 grams of treatment material may be used.

Liquid solvent, such as the preferred carbon dioxide, flows from the storage container 120, through the pump 104, through the treatment material introduction vessel 106 and into the vessel 102 and the associated lines at the storage pressure. Pump 104 is started to circulate the solvent and increase pressure. Pump 104 raises the pressure in the system to a predetermined pressure. The predetermined pressure may be selected to provide optimal solvent properties to the carbon dioxide, such as raising the solvent to a supercritical state. Solvent flows from the pump 104, through the treatment material introduction vessel 106. The solvent dissolves treatment material in the treatment material introduction vessel 106 forming a solution that is fed into the vessel 102.

System pressure increases to a desired predetermined pressure. The temperature and pressure of the solvent are controlled as determined by the solubility of the treatment material to be in a phase or condition so the treatment material may dissolve for a desired solute concentration. Pressure and volume of solvent may be increased in a known manner by a make-up supply and pump (not shown).

For example, when supercritical carbon dioxide ($SCCO_2$) is at 3600 PSIG or higher pressure and a temperature of 40° C., the preferred treatment material dissolves. The treatment material in the treatment material introduction vessel 106 dissolves in the solvent flowing through it at supercritical conditions. It will also be apparent that the treatment material can be in liquid form and pumped into the system 100.

Flow through the treatment material introduction vessel 106 continues until the desired concentration of the treatment material solute in the solvent is attained. This flow path is maintained until the desired amount of solids in the treatment introduction vessel 106 is dissolved to obtain a desired predetermined concentration of treatment material in the solution.

Once the desired system conditions are reached, the treatment material solute and solvent in the solution are circulated through the system 100 for an appropriate predetermined time. The flow path may be any suitable flow path. By way of example, the solution is routed through the pump 104, through the treatment material introduction vessel 106, into the interior of the core 140 in the treatment vessel 102, through the roll of sheet material, into the treatment vessel, and then back to pump. This flow maintenance for a period of time assures that the treatment material is uniformly dissolved in the inorganic solvent and that every surface of the roll of sheet material has been exposed to the treatment material solution.

The pressure and/or temperature of the solution are/is then permitted to change to a condition in which the treatment material solute is no longer soluble. The treatment material precipitates out of the solution when it first becomes insoluble. The precipitated treatment material deposits onto the surfaces of the laminated article 20. The pressure can then be further reduced to atmospheric so the vessel 102 can be opened. The deposited treatment material does not block the pores of the membrane 22 or support fabric 24 so air permeability of the laminated article 20 is not adversely affected. The deposited treatment material covers all or at least substantially all of the surfaces in the sheet material, such as the surfaces defining the pores in the laminated article 20 and the outer surface of the membrane side 42 and the outer surface of the fabric side 44.

Heat may optionally be applied to the treated laminated article 20 if it was treated with a treatment material that included a cross-linking agent, such as Fabati 100. Heat may be applied at about 280° F. (165° C.) heat for about 60 minutes to the laminated article 20 to cross-link the treatment material.

Although the aspects herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

Having described at least one aspect of the invention, what is claimed is:

1. An article comprising:
    a microporous membrane;
    a porous fabric laminated to the microporous membrane to form a laminate with a membrane side and a fabric side; and
    a treatment material applied to the laminate to form a treated laminate, the treated laminate having an oil resistance of at least a number 8 determined by AATCC 118 testing on both the membrane side and the fabric side and having an air permeability through the treated laminate of at least 0.01 CFM per square foot determined by ASTM D737 testing.

2. The article of claim 1 wherein the microporous membrane is selected from the group consisting essentially of expanded polytetrafluoroethylene (ePTFE), polyurethane, polypropylene, polyethylene, polyether sulfone, polyvinylidene fluoride and polycarbonate.

3. The article of claim 1 wherein the microporous membrane is thermally laminated to the porous fabric.

4. The article of claim 1 wherein the treatment material comprises a fluoropolymer.

5. The article of claim 4 wherein the treatment material comprises a perfluoroakyl acrylic copolymer.

6. The article of claim 5 wherein the perfluoroakyl acrylic copolymer is cross-linked.

7. The article of claim 1 wherein the treated laminate has a moisture vapor transmission rate (MVTR) of at least 1500 gr/m$^2$/day determined by JISL-1099B2 testing.

8. The article of claim 1 wherein the treated laminate has a Mullen Water Entry pressure determined by challenging the membrane side of at least 10 PSI.

9. The article of claim 1 wherein the treated laminate has an air permeability of at least 0.15 CFM per square foot.

10. The article of claim 1 wherein the treated laminate has an oil resistance of at least a number 8 determined by AATCC 118 testing on both the membrane side and the fabric side and having an air permeability through the treated laminate of at least 0.15 CFM per square foot determined by ASTM D737 testing.

11. A vent comprising:
    a microporous membrane of expanded polytetrafluoroethylene (ePTFE);
    a porous fabric laminated to the microporous membrane to form a laminate with a membrane side and a fabric side; and
    a treatment material applied to the laminate to form a treated laminate, the treated laminate having an oil resistance of at least a number 8 determined by AATCC 118 testing on both the membrane side and the fabric side and having an air permeability through the treated laminate of at least 0.01 CFM per square foot determined by ASTM D737 testing.

12. The vent of claim 11 wherein the treatment material comprises a fluoropolymer.

13. An article comprising:
    a microporous membrane of expanded polytetrafluoroethylene (ePTFE);
    a porous fabric laminated to the microporous membrane to form a laminate with a membrane side and a fabric side; and
    a treatment material applied to the laminate to form a treated laminate, the treated laminate having an oil resistance of at least a number 8 determined by AATCC 118 testing on both the membrane side and the fabric side, having an air permeability through the treated laminate of at least 0.15 CFM per square foot determined by ASTM D737 testing and having a Mullen Water Entry pressure determined by challenging the membrane side of at least 10 PSI.

14. The article of claim 13 wherein the microporous membrane is thermally laminated to the porous fabric.

15. The article of claim 13 wherein the treatment material comprises a fluoropolymer.

16. The article of claim 15 wherein the treatment material comprises a perfluoroakyl acrylic copolymer.

17. The article of claim 16 wherein the perfluoroakyl acrylic copolymer is cross-linked.

18. The article of claim 13 wherein the treated laminate has a moisture vapor transmission rate (MVTR) of at least 1500 gr/m$^2$/day determined by JISL-1099B2 testing.

* * * * *